US010493586B2

(12) United States Patent
Kost

(10) Patent No.: US 10,493,586 B2
(45) Date of Patent: Dec. 3, 2019

(54) PASSIVE BUFFER BRUSH AIR COOLING

(71) Applicant: BRIDGESTONE BANDAG, LLC, Muscatine, IA (US)

(72) Inventor: Troy A. Kost, LeClaire, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 0 days.

(21) Appl. No.: 14/948,659

(22) Filed: Nov. 23, 2015

(65) Prior Publication Data
US 2016/0074982 A1 Mar. 17, 2016

Related U.S. Application Data

(62) Division of application No. 13/788,915, filed on Mar. 7, 2013, now Pat. No. 9,227,287, which is a division
(Continued)

(51) Int. Cl.
*B24B 1/00* (2006.01)
*B24D 13/10* (2006.01)
(Continued)

(52) U.S. Cl.
CPC .............. *B24B 1/00* (2013.01); *A46B 13/003* (2013.01); *A47L 11/19* (2013.01); *A47L 11/4041* (2013.01); *B24B 5/366* (2013.01); *B24B 29/005* (2013.01); *B24B 55/02* (2013.01); *B24B 55/06* (2013.01); *B24D 13/10* (2013.01); *B24D 13/18* (2013.01); *B29D 30/56* (2013.01); *B29D 2030/541* (2013.01)

(58) Field of Classification Search
CPC ......... B24B 5/366; B24B 1/00; B24B 29/005; B24B 55/02; B24B 55/06; B24D 13/18; B24D 13/10; A47L 11/19; A47L 11/4041; A46B 13/003
USPC ........................................................ 451/49
See application file for complete search history.

(56) References Cited

U.S. PATENT DOCUMENTS 2,110,494 A * 3/1938 Zimmerman .......... B24D 13/18
15/230.1
2,136,747 A 11/1938 Levoy
(Continued)

FOREIGN PATENT DOCUMENTS

DE 10 64 915 9/1959
EP 1428624 A2 6/2004
(Continued)

OTHER PUBLICATIONS

Japanese Office Action—Official Decision of Refusal dated Mar. 22, 2016, in related Japanese patent application 2014-125305.
(Continued)

*Primary Examiner* — Dung Van Nguyen

(57) ABSTRACT

In one embodiment, the present invention provides a buffer brush. When rotating, the buffer brush acts as a centrifugal pump. The buffer brush contains a core having a first side and a second side and the brush extends racially from the surface of the core. The first and second sides have at least one opening configured to allow air to flow laterally through the core. Vents on the surface of the cure are configured to allow air flowing laterally through the core to also flow radially through the vents into the brush.

8 Claims, 4 Drawing Sheets

Related U.S. Application Data of application No. 12/629,486, filed on Dec. 2, 2009, now abandoned.

(51) Int. Cl.

| | | |
|---|---|---|
| *B24D 13/18* | (2006.01) | |
| *B29D 30/56* | (2006.01) | |
| *A46B 13/00* | (2006.01) | |
| *B24B 29/00* | (2006.01) | |
| *B24B 55/02* | (2006.01) | |
| *B24B 55/06* | (2006.01) | |
| *B24B 5/36* | (2006.01) | |
| *A47L 11/19* | (2006.01) | |
| *A47L 11/40* | (2006.01) | |
| *B29D 30/54* | (2006.01) | |

(56) References Cited

U.S. PATENT DOCUMENTS

| | | | |
|---|---|---|---|
| 2,140,208 A | | 12/1938 | Murray |
| 2,452,268 A | * | 10/1948 | Schumann ............... B24B 23/02 |
| | | | 173/213 |
| 2,479,941 A | | 8/1949 | Kummer |
| 2,633,680 A | * | 4/1953 | Goldberg ............... A01D 34/82 |
| | | | 15/230.1 |
| 2,636,324 A | * | 4/1953 | Ruthven ............... B24D 13/18 |
| | | | 15/230.1 |
| 2,637,957 A | | 5/1953 | Kanter |
| 2,705,855 A | | 4/1955 | Miellsen |
| 2,921,328 A | | 1/1960 | Bongiovanni |
| 3,107,381 A | | 10/1963 | Tilgner |
| 3,109,190 A | * | 11/1963 | Nelson ............... A46B 13/003 |
| | | | 15/181 |
| 3,648,316 A | | 3/1972 | Habian et al. |
| 4,240,851 A | | 12/1980 | King |
| 2,658,316 A | | 11/1983 | Davies |
| 4,902,313 A | | 2/1990 | Penter |
| 5,185,960 A | | 2/1993 | Majerus et al. |
| 5,247,981 A | | 9/1993 | Benedicto et al. |
| 5,283,493 A | | 2/1994 | Hokanson et al. |
| 5,299,748 A | | 4/1994 | Brewer |
| 5,313,745 A | | 5/1994 | Mace et al. |
| 5,342,473 A | | 8/1994 | Bibona et al. |
| 5,423,717 A | | 6/1995 | Boaz |
| 5,447,587 A | | 9/1995 | Bibona et al. |
| 5,492,785 A | | 2/1996 | Normandin et al. |
| 5,590,838 A | | 1/1997 | Brewer |
| 5,846,125 A | | 12/1998 | Robichon |
| 6,015,105 A | * | 1/2000 | Brewer ................... B29B 17/02 |
| | | | 241/279 |
| 6,234,055 B1 | | 5/2001 | Taylor |
| 6,295,687 B1 | | 10/2001 | Dehart |
| 6,425,540 B1 | | 7/2002 | Morris et al. |
| 6,687,339 B2 | | 2/2004 | Martin |
| 6,739,960 B2 | | 5/2004 | Sauer |
| 6,745,809 B1 | | 6/2004 | Mory et al. |
| 6,757,934 B2 | | 7/2004 | Park |
| 6,772,476 B2 | | 8/2004 | Park |
| 6,953,500 B2 | | 10/2005 | Lewis |
| 6,976,646 B2 | | 12/2005 | Morris et al. |
| 7,040,371 B2 | | 5/2006 | Mory et al. |
| 7,121,937 B2 | | 10/2006 | Turch et al. |
| 7,255,451 B2 | | 8/2007 | McCabe et al. |
| 7,391,563 B2 | | 6/2008 | McCabe et al. |
| 7,497,153 B2 | | 3/2009 | Brunton |
| 2005/0194077 A1 | | 9/2005 | Yap |
| 2006/0288991 A1 | | 12/2006 | Baratta |

FOREIGN PATENT DOCUMENTS

| | | | | |
|---|---|---|---|---|
| GB | 1 001 937 | | 8/1965 | |
| GB | 1001937 A | * | 8/1965 | ......... B29B 17/0206 |
| JP | 59-019666 | | 2/1984 | |
| JP | H07-186302 | | 7/1995 | |
| JP | 07-223273 | | 8/1995 | |
| JP | 08-309669 | | 11/1996 | |
| JP | 2002-086588 | | 3/2002 | |
| JP | 2008-126479 | | 6/2008 | |
| KR | 100512321 | | 8/2005 | |

OTHER PUBLICATIONS

European Patent Office, Extended European Search Report and Opinion in European Application No. 10834921.8, dated Sep. 27, 2013, 5 pp.
JPO, Office Action in Japanese Patent Application No. 2012-54203, 2 pp., dated Dec. 24, 2013.
KIPO, International Search Report and Written Opinion for International Application No. PCT/US2010/055840, 8 pp., dated Jul. 27, 2011.
Mexican Institute of Industrial Property, Office Action in Mexican Patent Application No. MX/a/2012/005158, dated Jan. 28, 2015, 9 pp.
The Notification of Reasons for Refusal issued in Japanese Patent Application No. 2014-125305, dated Aug. 4, 2015.
The Chinese Office Action issued in Chinese Application No. 201080054504.1, dated Dec. 4, 2015.
European Patent Office, the European Search Report in European Application No. 16193644, dated Jan. 23, 2017.
European Patent Office, the European Search Opinion in European Application No. 16193644, dated Jan. 23, 2017.
European Search Report from corresponding EP Application No. EP16193644.8, pp. 1-2.

* cited by examiner

PASSIVE BUFFER BRUSH AIR COOLING

CROSS REFERENCE TO RELATED APPLICATIONS

The present application is a divisional of U.S. patent application Ser. No. 13/788,915, filed Mar. 7, 2013, which is a divisional of U.S. patent application Ser. No. 12/629,486, filed Dec. 2, 2009, and the contents of which are incorporated herein by reference in their entirety.

BACKGROUND OF THE INVENTION

Buffer brushes are used in a variety of applications. For example, buffer brushes are used for removing the tread of worn tires. Tire buffing is part of the tire retreading operation. However, buffer brushes used in the process of removing the tread of worn tires often wear out and must be replaced frequently. Buffer brushes are also used to add texture to the surface of a newly manufactured tread.

Typically the tire casing selected for retreading is buffed to remove excess rubber to provide a substantially evenly textured crown for receiving a tread strip and to provide a predetermined tire casing profile. Prior to retreading, the casing must be buffed, generally to a predetermined characteristic crown radius corresponding to the upper contour of the belt package. The casing is buffed to leave only a predetermined thickness of material remaining over the top belt. The shoulder of the casing is also buffed to eliminate or reduce voids or patterns in the shoulder created by the original tread, and to provide a relatively straight profile between the casing side walls and the crown. A worn casing from each of the various models and sizes of new tires has a characteristic tire casing profile of a particular crown width, crown buffing radius and should trim angle which must be created as an initial step in the buffing process.

In present retreading processes, it is important that the surface of the tire casing be carefully buffed about the shoulder areas of the tire to ensure that the tread layer width is approximately the same as the buffed surface of the casing. If the shoulder areas are not sufficiently buffed and trimmed, the tread edges may come loose and/or the cushion gum extending beyond the tread edges will not bond to the casing shoulder. Such problems can reduce the longevity of the retreaded tire and adversely impact the appearance of the retreaded tire.

The tire casing is buffed to remove tread material and to achieve a desired surface texture. Typically, it is desired for the crown and the shoulders of the tire casing to have different textures. The surface texture can be measured on a visual scale propounded by the Rubber Manufacturer's Association (RMA) with a numerical value between 1 and 6 with 1 being the finest and 6 being the roughest texture. Typically, it is desired for the crown of the tire casing to have a RMA number of between 3 and 4 and for the shoulder to have an RMA number of about 2. The shoulders of the tire casing typically are subjected to the largest stresses encountered by the tire during service. The finer texture on the shoulders promotes better adhesion of the tire tread to the casing at these high stresses. If the shoulders received too much texturing, crack propagation in these areas is more likely. In instances where the shoulder receives too little texturing, the bond between the tire casing and the tread is poorer.

The current state of the art in tire casing buffing allows for a multiplicity of tread removal passes, substantially in a sideways, pass after pass method. U.S. Pat. No. 6,745,809 to Mory et al. and assigned to Bandag Licensing Corp. describes a tire buffing apparatus and is incorporated herein in its entirety for everything that it teaches.

BRIEF SUMMARY OF THE INVENTION

In one aspect, the present invention provides a buffer brush. The buffer brush contains a core having a first side and a second side and the brush extends radially from the surface of the core. The first and second sides have at least one opening configured to allow air to flow laterally through the core. Vents on the surface of the core are configured to allow air flowing laterally through the core to also flow radially through the vents into the brush.

In another aspect, a buffer brush is provided having a first end plate with a plurality of openings and a second end plate with a plurality of openings. At least one brush segment comprises a core having openings configured for lateral air flow and vents configured for radial air flow and brush bristles extending radially from the core. The brush segment is mounted between the first end plate and the second end plate and configured such that air can flow through the openings in the first end plate and the second end plate and through the openings configured for lateral air flow and vents configured for radial air flow.

Another aspect of the invention provides a method of buffing. A buffer brush is provided. The brush contains a core having a first side and a second side and the brush extends radially from the surface of the core. The first and second sides have at least one opening configured to allow air to flow laterally through the core. Vents on the surface of the core are configured to allow air flowing laterally through the core to also flow radially through the vents into the brush. The brush is rotated such that air flows laterally through the core and radially through the vents.

BRIEF DESCRIPTION OF THE SEVERAL VIEWS OF THE DRAWING(S)

DETAILED DESCRIPTION OF THE INVENTION

In accordance with the teachings of the present invention, a buffer brush is provided. In one embodiment, the buffer brush is used in a tire buffing apparatus. However, the buffer brush may be used in a variety of applications and is not limited to tire buffing.

Figure 1:
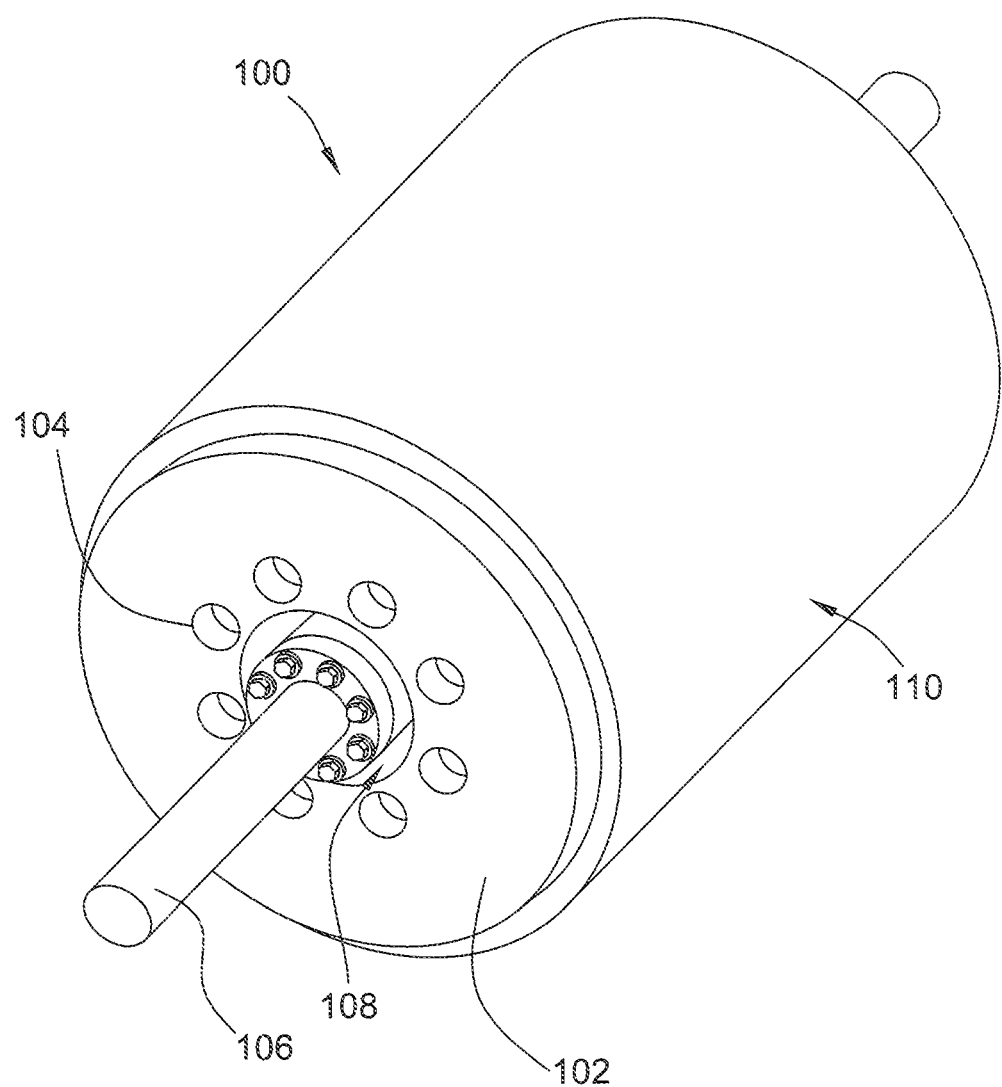
FIG. 1 illustrates one embodiment of a brush assembly including end plates having vent openings.

Turning now to the figures, an illustrative embodiment of a brush assembly 100 including end plates 102 having openings 104 is shown in FIG. 1. In the illustrated embodiment, an axel 106 traverses the brush assembly 100 laterally through the brush assembly's core 108. In one embodiment, the brush assembly 100 includes brush bristles 110 extending radially from the core 108. The rotation of the brush assembly 100 acts as a centrifugal pump. Air is pulled through the openings 104 in the endplate 102. The air traverses the brush laterally through the core 108 and vents through the brush bristles 110. During a buffing operation, the brush bristles 110 may become warmer than the ambient temperature. The air venting through the brush bristles 110 cools the bristles and may extend the brush life.

Figure 2:
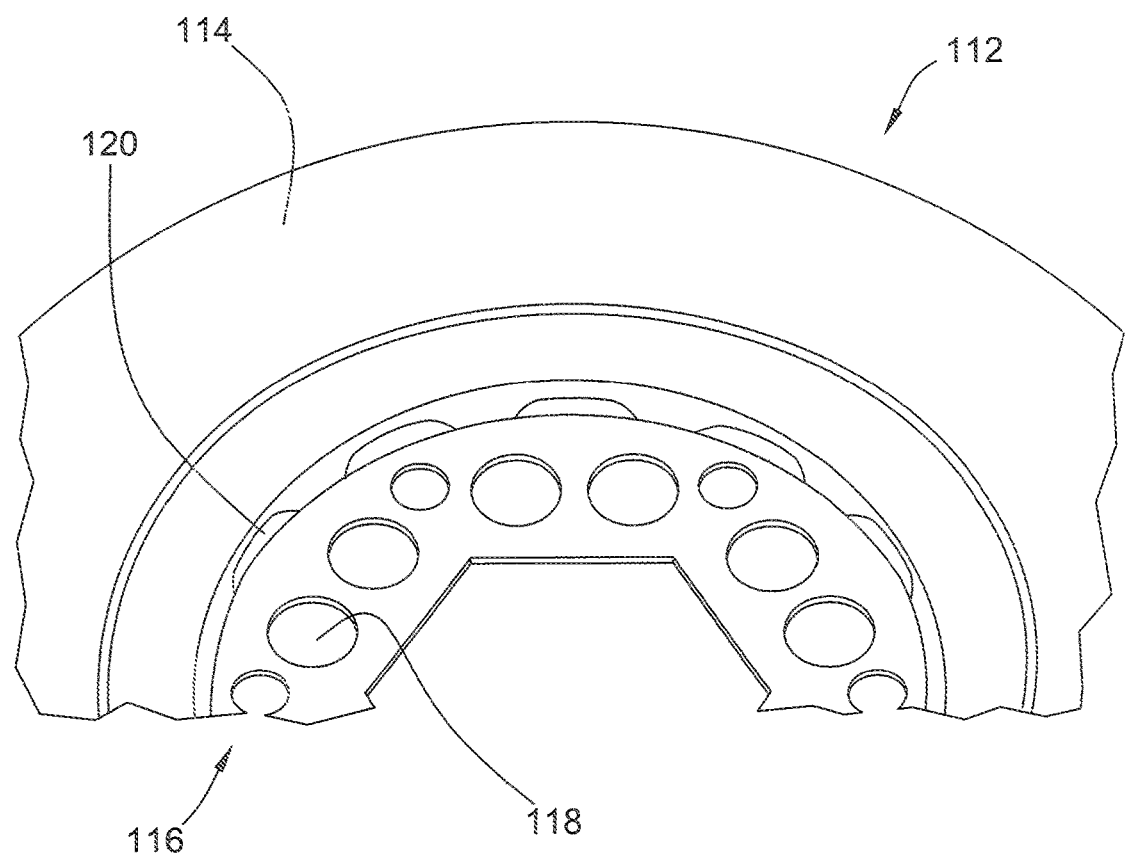
FIG. 2 illustrates one embodiment of a brush segment that may be used to construct the brush assembly illustrated in FIG. 1.

The brush assembly 100 may be constructed using one or more brush segments. FIG. 2 illustrates one embodiment of a brush segment 112 that may be used to construct the brush assembly 100 illustrated in FIG. 1. FIG. 2 shows only a portion of the brush segment 112. In one embodiment, the brush segment 112 includes brush bristles 114. The core 116 may be constructed from metal, plastic or other suitable material for supporting the brush bristles 114. Openings 118 in the core 116 allow air to traverse laterally through the assembled buffer brush assembly 100 (FIG. 1). Vents 120 allow air traversing laterally though the core to escape radially through the brush bristles 114.

Figure 3:
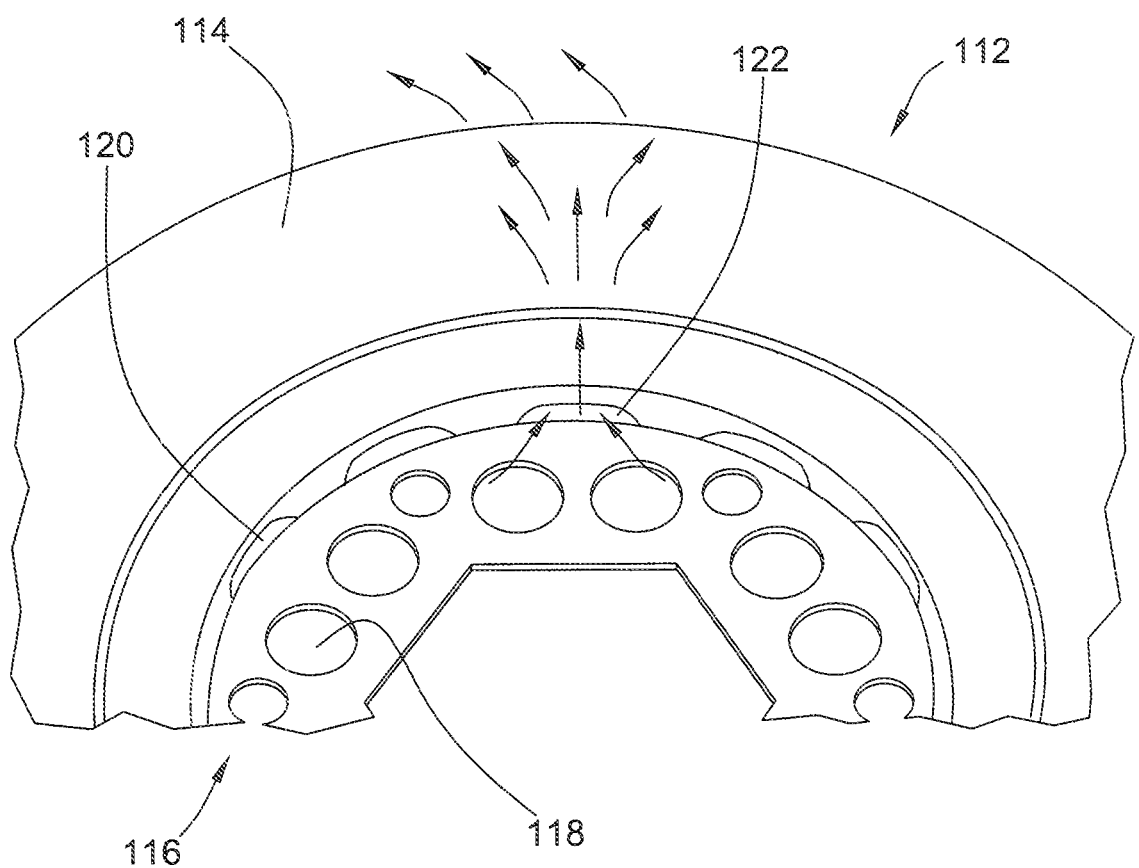
FIG. 3 illustrates one embodiment of air flow through the brush segment illustrated in FIG. 2.

FIG. 3 illustrates one embodiment of air flow through the brush segment illustrated in FIG. 2. As the brush assembly rotates, centrifugal forces pump air through the openings 118 in the core 116. The air escapes from the core 116 through vents 120. One illustrative example of air flow through a vent 122 and the brush bristles 114 is shown. Pumping air through the openings 118 in the core 116 and through the vents 120 collects any dust that is generated during buffing. For example, buffing the tread from a tire may result in small rubber particles or dust. Air flowing through the brush bristles 114 helps force the dust out of the brush. In an alternative embodiment, the brush bristles 114 may have larger openings or cuts to allow additional air flow from the vents 120.

Figure 4:
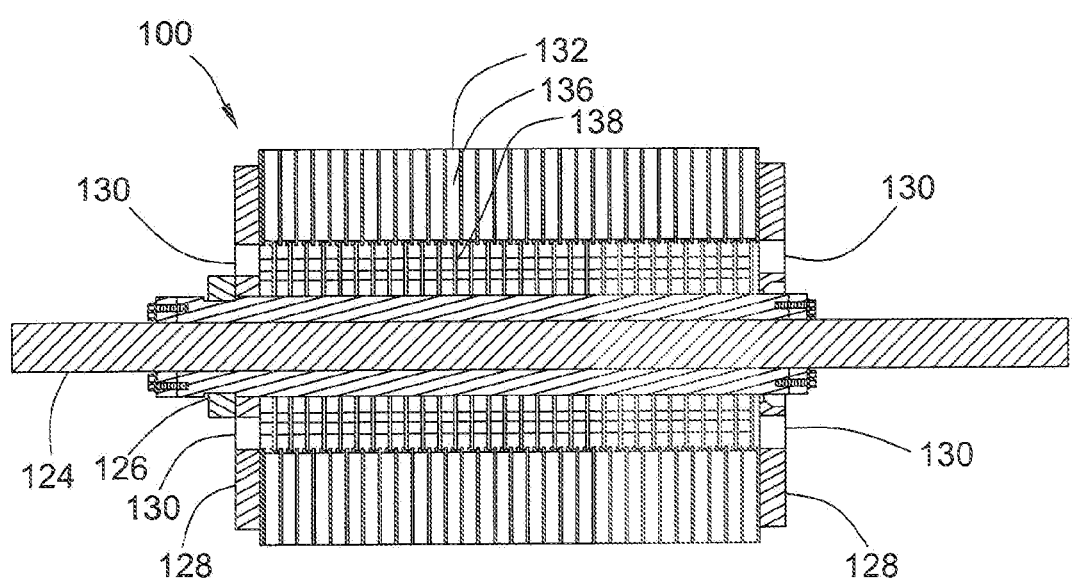
FIG. 4 illustrates multiple brush segments and endplates forming the brush assembly.

FIG. 4 is a cross sectional view of multiple brush segments and endplates forming the brush assembly 100 illustrated in FIG. 1. In this embodiment, an axel 124 traverses the brush assembly 100 laterally through the brush assembly's core 126. End plates 128 contain openings 130, allowing air to enter the brush assembly's core 126. In this embodiment, the brush assembly 100 is formed from a plurality of brush segments 132. The brush segments include brush bristles 136 and a brush segment core 138. The brush segment cores 138 contain holes (not shown) that allow air to traverse the brush assembly core laterally and vents (not shown) that allow air to vent radially through the brush segment bristles 136. When spinning, the brush acts as a centrifugal pump, pulling air through the end plate 128 openings 130. The air traverses the brush assembly's core 126 through openings in the brush segment 132 core 138. The air is vented through the brush bristles 136 through vents in the brush segment 132 core 138. Pumping air through the brush bristles cools the bristles, thus extending the brush life. Additionally, dust and other particles are removed from the bristles 136 and can be collected.

As one example application, the buffer brush can be used in a tire buffing apparatus for buffing a tire casing as part of a retread operation. The tire buffing apparatus can include a base assembly, a rasp pedestal, a moving assembly, a tire hub assembly, an operator station associated with a control unit, an electrical enclosure, and a pneumatic enclosure. The rasp pedestal can include a rasp head and a texturing device, such as the buffer brush, mounted to a single shaft for rotation thereabout. The rasp pedestal can rotate about a vertical axis. The moving assembly can be mounted to the base assembly and connected to the rasp pedestal for selectively moving the rasp pedestal along a pair of perpendicular horizontal X and Y axes. The tire hub assembly can be included for rotating the tire casing. The tire buffer can be operated at the operator station by interfacing with the control unit, which can be housed in the electrical enclosure. The tire buffer can include a tire location mechanism mounted to the rasp pedestal for detecting a tire casing mounted to the tire hub assembly when the rasp pedestal is within a predetermined distance of the tire casing. A tire measurement mechanism can be mounted to the pedestal for measuring the size of the tire casing mounted to the hub assembly.

The tire buffer can automatically buff a tire casing to achieve a predetermined tire casing profile and impart a texture thereto. The control unit can be associated with a current sensor which senses the current draw of a rasp drive motor for rotating the rasp head and the texturing device. During the buffing sequence, the control unit can compare the actual current draw of the rasp drive motor to a predetermined target current draw and adjust an operating characteristic of the tire buffer, such as the traverse speed of the rasp pedestal across the width of the tire casing being buffed, in response to any difference therebetween to urge the actual current draw toward the target current draw. In other embodiments, the operating parameter monitored and/or the operating characteristic that is changed to change the monitored operating parameter can be varied.

The tire buffer can automatically impart a predetermined shoulder texture upon shoulders of the tire casing being buffed with the texturing device. The tire buffing apparatus is fully detailed in U.S. Pat. No. 6,745,809 to Mory et al. which is assigned to Bandag Licensing Corp.

In a second exemplary application, the buffer brush can be used as part of a process to add texture to newly manufactured tread. In one embodiment, tread is molded into flat 35 foot long sections. These sections have a smooth surface. The tread sections are processed through a series of buffers to remove the smooth surface and texturize the surface of the tread.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A buffer brush, comprising:
   a first end plate having a plurality of openings and a second end plate having a plurality of openings; and
   at least one brush segment comprising:
     a brush segment core, the brush segment core defining a plurality of openings structured to allow air to traverse the brush segment core in a lateral direction parallel to a rotational axis of the at least one brush segment, the openings disposed at a radial distance from the rotational axis of the at least one brush segment, the brush segment core further defining vents communicating with the openings formed in the brush segment core and disposed radially outward from the openings, the vents configured for radial air flow, at least one of the vents being in communication with at least two of the openings formed in the brush segment core, the brush segment core comprising a greater number of openings than vents, and
     brush bristles extending radially from the brush segment core, wherein the brush bristles are configured to receive air vented radially through the vents in the brush segment core and remove particles from the brush bristles,
   the at least one brush segment being mounted between the first end plate and the second end plate and configured such that air can flow through the openings in the first end plate, through the openings in the second end plate and through the openings formed in the brush segment core.

2. The buffer brush of claim 1, wherein the brush segment cores of a plurality of brush segments comprise a brush assembly core.

3. The buffer brush of claim 1, wherein the brush bristles include wire brush bristles.

4. The buffer brush of claim 1, further comprising an axel supporting the brush segment core.

5. A method of buffing, comprising:
   providing at least one brush segment comprising:
     a brush segment core, the brush segment core defining a plurality of openings structured to allow air to traverse the brush segment core in a lateral direction parallel to a rotational axis of the at least one brush segment, the openings disposed at a radial distance from the rotational axis of the at least one brush segment, the brush segment core further defining vents communicating with the openings and configured for radial air flow, the vents disposed radially outward from the openings, each of the vents being in communication with at least two of the openings formed in the brush segment core, the brush segment core comprising a greater number of openings than vents, and
     brush bristles extending radially from the brush segment core, wherein the brush bristles are configured to receive air vented radially through the vents in the brush segment core; and
   rotating the buffer brush such that air flows laterally through the openings of the brush segment core and radially through the vents of the brush segment core and through the brush bristles, the air vented radially through the vents removing particles from the brush bristles.

6. The method of claim 5, further comprising buffing a tire with the buffer brush.

7. The method of claim 5, wherein the brush segment cores of a plurality of brush segments comprise a brush segment assembly core.

8. The method of claim 5, wherein the brush bristles include wire brush bristles.

* * * * *